Aug. 15, 1950  A. E. ANDERSON  2,518,589
MILKING MACHINE
Filed June 13, 1947  2 Sheets-Sheet 1

INVENTOR.
Austin E. Anderson
BY
Bean, Brooks, Buckley + Bean.
ATTORNEYS

Aug. 15, 1950     A. E. ANDERSON     2,518,589
MILKING MACHINE
Filed June 13, 1947     2 Sheets-Sheet 2
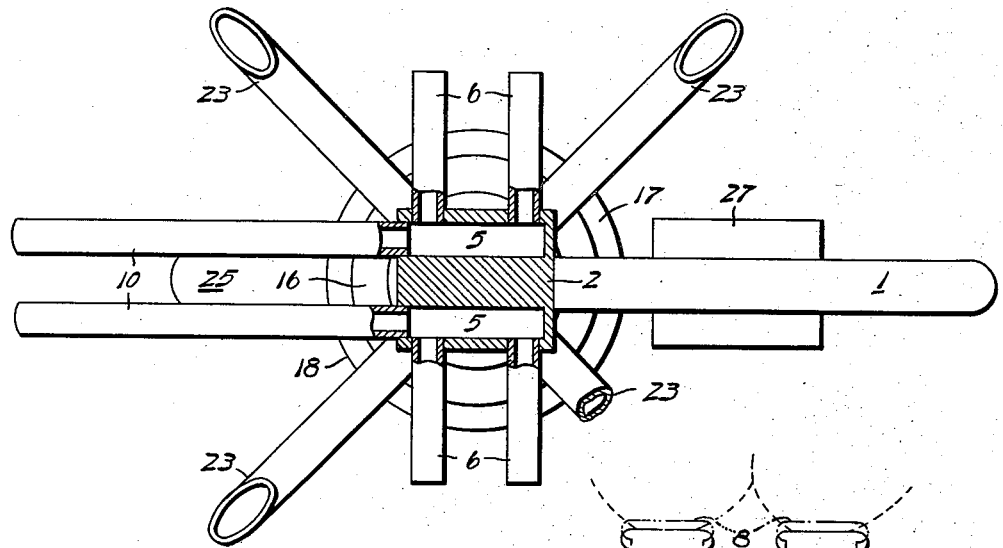
Fig. 3.
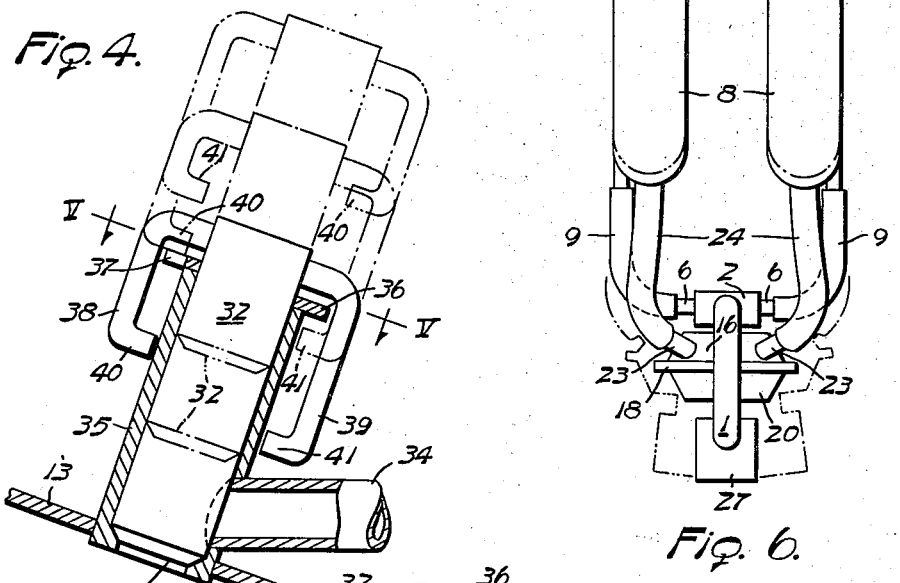
Fig. 4.
Fig. 5.
Fig. 6.
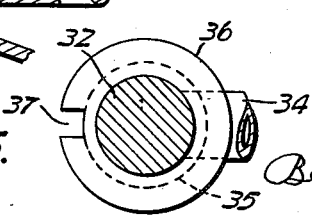
INVENTOR.
Austin E. Anderson
BY
Bean, Brooks Buckley & Bean
ATTORNEYS Patented Aug. 15, 1950

2,518,589

UNITED STATES PATENT OFFICE 2,518,589

MILKING MACHINE

Austin E. Anderson, Jamestown, N. Y.

Application June 13, 1947, Serial No. 754,372

10 Claims. (Cl. 31—83)

This invention relates to a milking apparatus such as is employed on dairy farms, the same being operable by fluid pressure simulating the motion and action when milking a cow by hand.

The primary object of this invention is to provide a milking apparatus which is efficient in use and simple in construction. Further, the invention has for its object to provide an arrangement in which there is imparted to the teat cups a more natural motion tending to increase the speed of milk flow.

Again, the invention will be found to reside in the suspension of the milking apparatus with a predetermined balance so as to secure a greater pull on the rear quarters of the udder, which quarters usually give more milk and therefore have in the past required greater milking time.

The invention further has for its object to provide a milking apparatus of few parts which may readily be disassembled so as to facilitate thorough cleaning of the same. Still further the invention aims to provide a milking apparatus in which the milk receiver is effectively closed or sealed when the milking is completed.

The foregoing and other objects will manifest themselves as the following description progresses, in which reference is made to the accompanying drawings, wherein Fig. 1 is an elevation of the improved milking apparatus;

Fig. 3 is a plan view of the unit with the manifold shown in section;

Fig. 4 is a sectional view through the receiver valve;

Fig. 5 is a detailed sectional view of the valve taken about on line 5—5 of Fig. 4;

Fig. 6 is a rear elevation depicting the sidewise milking motion of the unit.

Figure 1:
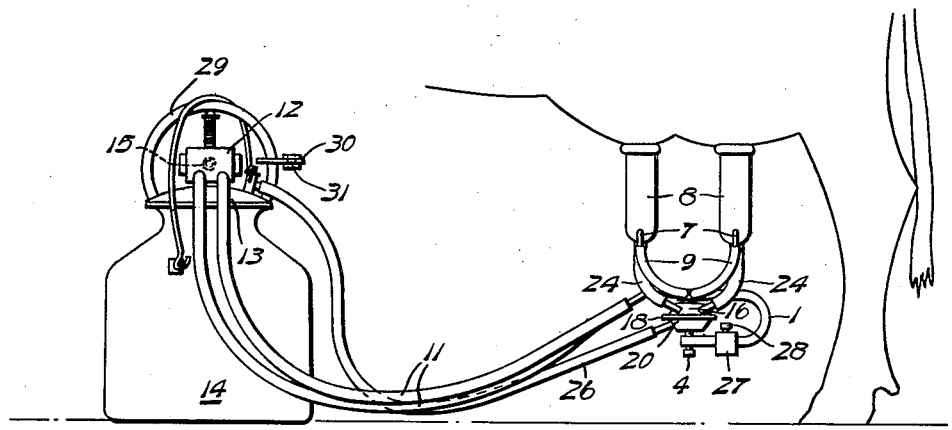

Referring more particularly to the drawing, the claw and manifold unit is herein shown as having a substantially U-shaped body 1 with a manifold 2 fixed on one leg and a claw 3 interposed between the legs and secured in position by a set screw 4 threaded through the opposite leg. The manifold has parallel side passages 5 each with laterally extending fore and aft nipples 6 which are connected to the suction nipples 7 of the teat cups 8 by conduits 9. The side passages 5 are also provided with suction supply nipples 10 which in turn are connected by the hose sections 11 to a pulsator 12 carried on the cover 13 of the milk receiver or container 14. The pulsator is of any approved design, such as that shown in my earlier Patent No. 2,304,746, and functions to alternately connect the manifold passages 5 to the source of suction through a supply nipple 15 on the pulsator. The source of suction may be a motor driven pump having its suction producing port connected to the nipple 15 by a suitable conduit, not shown.

Figure 2:
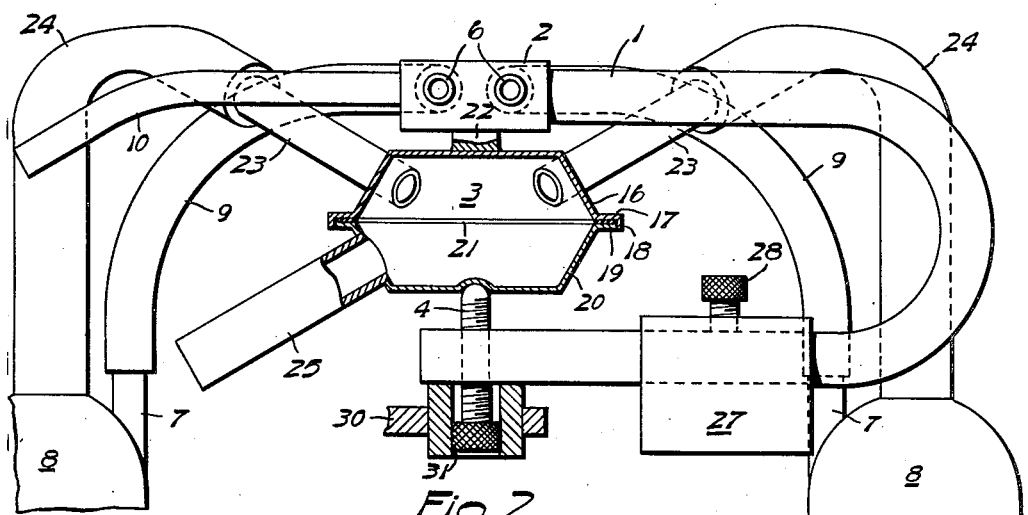
Fig. 2 is an enlarged fragmentary view of the claw and manifold unit in its stored position on the milk receiver, with parts in section and other parts in elevation.
Figure 7:
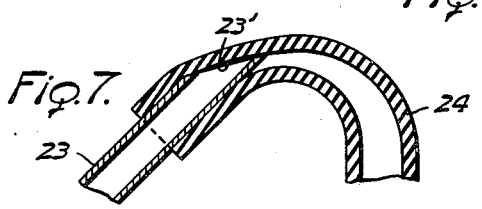
Fig. 7 is a sectional detail.

The claw or collector 3 comprises a pair of cup shaped sections, the upper section 16 having a rim 17 with an upstanding peripheral flange 18 within which latter the rim 19 of the companion section 20 seats, a rubber or other sealing gasket 21 being interposed between the rims 17 and 19 for effectively sealing the claw against leakage when the two sections are clamped together under the urge of the set screw 4. Furthermore, the atmospheric external pressure will cooperate with the suction which maintains within the claw to hold the claw sections firmly together. The manifold 2 may have a raised pad 22 upon which the upper section 16, as viewed in Fig. 2, seats, this pad being centered with respect to the axis of the set screw. The claw section 16 has a conical side wall supporting the radiating nipples 23 which are joined by sections of rubber hose 24 to the usual milk compartments of the teat cups 8. The outer end of each nipple 23 is beveled, as at 23', to provide a seat on which the hose will engage in a valving manner to interrupt the suction communication with the cup whenever the latter hangs freely in an inoperative position. The companion claw section 20 is also depicted as having a conical side wall with a drain nipple 25 connected to the receiver 14 by a hose 26. The cups therefore discharge into the claw and the claw drains into the receiver.

The U-shaped frame or body 1 extends in the opposite direction from the suction hose 11 and constitutes a counter poise for balancing the teat-cup suspended manifold and the claw unit in a manner to impose a heavier down pull on the two rear teats which are frequently longer in milking as compared to the forward teats. This differential downward urge or pull as imposed upon the teat cups may be regulated to the individual animal if desired, as by means of a weight 27 which is slidable along one of the legs of the body 1 and may be fixed in an adjusted position by a set screw 28.

During the milking operation the suspended unit will develop a sidewise swinging motion by reason of the fact that the teat cups on one side will lift when suction is applied to the corresponding manifold passage 5 and lower when the pulsator vents the passage to the atmosphere, at which latter time the teat cups on the opposite side will be elevated by having the suction applied to the other manifold passage 5. This alternate raising of the cups on the opposite sides of the animal produces a swinging motion to the suspended unit. This is exemplified in Fig. 6 wherein the right pair of cups will lift when suction is applied to the right manifold passage and swing the unit to the right as shown by the dot and dash lines in said view. Concurrent with this rightward swing, the opposite or left pair of cups will be vented to the atmosphere through their air connections 9 and drop and thereby permit the inflation tube of the cup to collapse. When the pulsator reverses the suction and atmospheric connections the left cups will elevate and the unit will swing leftward, all as indicated by the double dot and dash lines, and simultaneously the right cups will drop. This swinging motion serves to place the weight of the unit in a manner to secure a better milking action, and by reason of the heavy or weighted frame 1 this swinging motion will be amplified in its greater pull upon the rear teats. The rhythmic motion is therefore utilized in imposing the weight of the unit to the best advantage throughout the milking operation.

The cover 13 is provided with a carrying handle 29 to which latter may be fixed a bracket 30 having an opening 31 in which the set screw 4 may be engaged to support the entire milking unit including the teat cups when not in use. In such stored position the cups will droop and thereby cause the cup hose 24 to flex down onto the beveled seats and seal off the suction influence in the receiver.

Prior to removing the cups from the animal the low pressure maintained in the system may be preserved in the receiver by closing the valve 32 onto its seat 33 where it will be firmly held by the pressure differential. As shown in Fig. 4, this valve is interposed in the milk flow passage from the claw to the receiver and to this end the hose 26 will be connected to a nipple 34 carried by the valve housing 35. The valve 32 has a sliding fit in its housing 35 and consequently the pressure differential will normally urge the valve inwardly and, when the valve is free, will move the valve quickly to its seat and hold it there. To support the valve in an open position, the valve housing is provided with a flange 36 which has a peripheral notch 37, while the valve itself is formed with oppositely extending fingers 38 and 39 which overhang the flange to different extents. The free extremity of each finger is turned inwardly to form a retaining lug (40, 41) which is designed to pass freely through the notch 37 when in registry therewith, but since the fingers extend in opposite directions it is apparent that the valve must be rotated 180° to effect successive registrations for passing both retaining lugs to enable removal of the valve from its housing. The differential extent of the finger lugs 40 and 41 enables the lug 40 alone being moved through the notch 37 and the valve slightly rotated to rest the lug upon the top side of the flange 36 for supporting the valve in its open position, as shown in the dot and dash lines in Fig. 4. When in such open position the underlying lug 41 will serve to retain the valve from total displacement, but should the valve be rotated sufficiently to register the lug 41 with the notch, the valve may be entirely removed, as shown by the dot and dash lines.

The milking apparatus of the present invention is practical and simple in design and therefore economical in production. It is efficient in operation and provides an action which accelerates the milking. Furthermore, the valve 32 is so designed as to be either fully closed or fully opened. The operator can always see the position of the valve and determine whether it is in one position or the other, and since it is pressure responsive the operator can be assured of the fact that when the valve is not in its fully opened position it will be firmly closed by the pressure differential. The operator of the machine cannot carelessly leave the valve in a partly opened position which would throttle or restrict the size of the passage 34 with a resultant impairment in the efficiency and performance of the milking machine. The valve seat 33 may be dispensed with since the sliding fit of the valve in its housing will be sufficient to provide a valving action when the valve moves downwardly beyond the inflow passage 34. Therefore, that portion of the housing beneath the inflow passage may be considered as the valve seat whether or not the seat extends out into the path of the valve. The movement of the valve across the inflow passage 34 seals the same, and the valve must be lifted sufficiently to engage one of the lugs 40, 41 on the upper side of the flange 36 in order to leave the valve in an open position. In such open position the passage 34 will be fully opened.

While the foregoing description has been given in detail for clearness of understanding it is not intended thereby to limit the invention since the inventive principles involved are capable of assuming other physical embodiments without departing from the spirit of the invention and the scope of the appended claims.

What is claimed is:

1. A milking machine comprising a teat-cup suspended manifold having front and rear ends and laterally extending pairs of fore and aft cup connections, with air and milk lines extending forwardly from the manifold, and a counterpoise extending rearwardly from the manifold and acting to counterbalance the line-imposed pull upon the manifold and additionally to impose a greater downward urge upon the two laterally extending aft connections as compared to the two laterally extending fore connections.

2. A milking machine comprising a teat-cup suspended manifold having front and rear ends and oppositely extending lateral pairs of fore and aft cup connections, a forwardly extending pressure hose connection, and a rearwardly extending counterpoise body counterbalancing the hose connection and acting to impose a differential downward urge upon the aft cup connections with respect to the fore cup connections.

3. A milking machine comprising a teat-cup suspended manifold having front and rear ends and oppositely extending lateral pairs of fore and aft cup connections, a pressure hose connection extending forwardly from the manifold, a counterpoise body extending rearwardly from the manifold and acting to impose a differential downward urge upon the aft cup connections with respect to the fore cup connections, and means adjustable on the body for regulating the degree of downward urge on the rear cups to the requirements of the individual animal.

4. A milking machine comprising a teat-cup suspended manifold having front and rear ends and sets of oppositely extending fore and aft cup connections, a weight arm extending at right angles to the extent of said connections, a hose connection extending from the latter in a direction opposite to the arm, and means adjustable on the arm for regulating the degree of downward urge imposed by the arm upon the adjacent set of cup connections with respect to the other set.

5. A milking machine comprising a teat-cup suspended manifold having sets of oppositely extending fore and aft cup connections and also having a hose connection extending forwardly thereof acting to tilt the forward end of the manifold downwardly, a counterweight arm carried by the manifold and extending rearwardly therefrom, said arm having a return portion, and a weight adjustably carried by the return portion to overbalance the tilting tendency of the hose connection and to impose a differential downward urge upon the two sets of cup connections with the urge on the aft cup connections being predominant.

6. A milking machine comprising a teat-cup suspended manifold having pressure connections for communication with the teat cups, said manifold having an arm extending outwardly therefrom and formed with a return bend providing a seat opposing the manifold, a milk claw interposed between and seating upon the manifold and the return bend of the arm, and means for securing the claw in position.

7. A milking machine comprising a teat-cup suspended manifold having pressure connections for communication with the teat cups, said manifold having a hose connection at one side and a counterweight arm on the opposite side, the arm and manifold constituting a rigid unit with the arm having a return bend providing a seat opposing the manifold, a milk claw interposed between and seating upon the manifold and the opposing seat, and means carried by the unit and serving to hold the claw in place.

8. A milking machine comprising a substantially U-shaped body having one leg in the form of a pressure manifold with communicating pressure connections, the two legs having opposing seats, a milk claw interposed between the legs and engaged with the seats to hold the claw in position, and means carried by the other leg for clamping the claw in position.

9. A milking machine comprising a substantially U-shaped frame incorporating a pressure manifold in one leg and a clamping member in opposition thereto in the other leg, a claw chamber interposed between and supported by the manifold and the clamping member, the manifold having laterally and oppositely extending cup attaching nipples, a pulsator connection extending from the manifold in a direction opposite from said frame, and a weight adjustable on one of the frame legs.

10. A milking machine comprising a teat-cup suspended manifold having a pair of pressure chambers therein with spaced nipple means communicating respectively with the chamber and extending from one end of the manifold, cup connections communicating with the pressure chambers and extending laterally from the manifold to the suspending cups, and a counterweight arm extending from the opposite end of the manifold in a plane between the two pressure chambers.

AUSTIN E. ANDERSON.

REFERENCES CITED

The following references are of record in the file of this patent:

UNITED STATES PATENTS

| Number | Name | Date |
| --- | --- | --- |
| 744,188 | Gillies | Nov. 17, 1903 |
| 1,316,582 | Leitch | Sept. 23, 1919 |
| 1,333,461 | Babson | Mar. 9, 1920 |
| 1,408,694 | Dineson | Mar. 7, 1922 |
| 1,417,801 | Cook | May 30, 1922 |
| 1,440,912 | Davies | Jan. 2, 1923 |
| 1,500,011 | Smith | July 1, 1924 |
| 1,538,735 | Oden | May 19, 1925 |
| 1,776,909 | Hull | Sept. 30, 1930 |
| 2,099,884 | Green | Nov. 23, 1937 |
| 2,156,195 | Robillard | Apr. 25, 1939 |
| 2,404,069 | Hinman | July 16, 1946 |

FOREIGN PATENTS

| Number | Country | Date |
| --- | --- | --- |
| 669,868 | France | Aug. 10, 1929 |
| 552,476 | Great Britain | Apr. 9, 1943 |